United States Patent Office 3,124,577
Patented Mar. 10, 1964

3,124,577
4-(HYDROXYALKYL CYCLIC AMINO)PROPYL-2-PHENYL-3,4-DIHYDRO-2H-1,4-BENZOTHIAZINES
Harman S. Lowrie, Glenview, Ill., assignor to G. D. Searle & Co., Chicago, Ill., a corporation of Delaware
No Drawing. Filed Mar. 8, 1962, Ser. No. 178,509
6 Claims. (Cl. 260—243)

The present invention relates to a group of 4-(hydroxyalkyl cyclic amino)propyl-2-phenyl-3,4-dihydro-2H-1,4-benzothiazines. More particularly, it relates to compounds of the formula

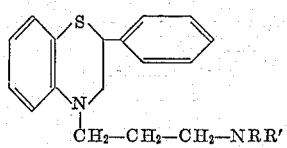

wherein —NRR' is a cyclic amino radical which is further substituted by a lower hydroxyalkyl radical. More particularly, —NRR' represents (lower hydroxyalkyl)-piperidino and (lower hydroxyalkyl)piperazino radicals. The lower hydroxyalkyl radicals referred to above contain up to 6 carbon atoms and are typified by radicals such as hydroxymethyl, 1-hydroxyethyl, 2-hydroxyethyl, 3-hydroxypropyl, 4-hydroxybutyl, and 6-hydroxyhexyl.

Equivalent to the basic amines of this invention for the purposes here described are their non-toxic acid addition salts and quaternary ammonium salts. Such salts are formed with a variety of inorganic and strong organic acids including sulfuric, phosphoric, hydrochloric, citric, malic, and related acids. Quaternary ammonium salts are formed with a variety of organic esters of sulfuric, hydrohalic, and aromatic sulfonic acids. Among such esters are methyl chloride and bromide, ethyl chloride, propyl chloride, dimethyl sulfate, methyl benzenesulfonate, ethylene chlorohydrin, and allyl bromide.

The compounds of this invention are useful because of their valuable pharmacological properties. More particularly, these compounds are depressants of the central nervous system but they lack the appetite inhibiting properties of related benzothiazines.

Various procedures are available for the preparation of the present compounds but the preferred method involves reduction of a 4-(hydroxyalkyl cyclic amino)alkanoyl-2-phenyl-3,4-dihydro-2H-1,4-benzothiazine of the formula

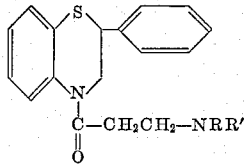

wherein —NRR' is defined as above. Lithium aluminum hydride is the preferred reagent for carrying out this reduction. The reaction is carried out in an anhydrous inert solvent such as ethyl ether. Alternately, a 4-chloroalkanoyl-2-phenyl-3,4-dihydro-2H-1,4-benzothiazine serves as the starting material and is reduced by lithium aluminum hydride to the corresponding 4-chloroalkyl compound of the formula

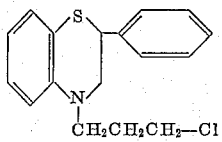

This compound is then reacted with an amine of the formula HNRR' wherein —NRR' is defined as above. This reaction is carried out by heating the reactants in an inert solvent at elevated temperatures for as long as several hours.

The compounds which constitute this invention and their preparation will appear more fully from a consideration of the following examples, which are given for the purpose of illustration only and are not to be construed as limiting the invention in spirit or in scope. In these examples quantities are indicated in parts by weight.

Example 1

A solution of 25 parts of 4-{3-[4-(2-hydroxyethyl)-piperazino]propionyl} - 2 - phenyl - 3,4 - dihydro-2H-1,4-benzothiazine in 710 parts of anhydrous ether is added portionwise to a stirred suspension of 12 parts of lithium aluminum hydride in 1100 parts of anhydrous ether. The resultant mixture is stirred and refluxed for 15 hours. An excess of ethyl alcohol is then added to the reaction mixture to decompose any unreacted lithium aluminum hydride. The reaction mixture is then shaken with concentrated sodium hydroxide solution. The ether layer is separated, washed with water, and dried over anhydrous potassium carbonate and the solvent is evaporated to give an oil which is 4-{3-[4-(2-hydroxyethyl)piperazino]-propyl}-2-phenyl-3,4-dihydro-2H-1,4-benzothiazine.

19.6 parts of the above free amine is dissolved in 1440 parts of boiling ethanol together with 13.9 parts of maleic acid and the resultant mixture is cooled. The crystalline material which forms is the bis-maleic acid salt of 4-{3-[4-(2-hydroxyethyl)piperazino]propyl}-2-phenyl-3,4-dihydro-2H-1,4-benzothiazine melting at about 169–170° C. The free base of this compound has the following formula

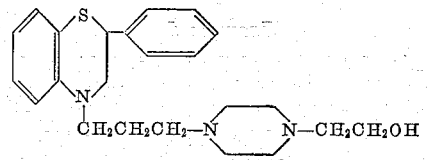

Example 2

Substitution of an equivalent quantity of 4-{3-[4-(3-hydroxypropyl)piperazino]propionyl} - 2 - phenyl-3,4-dihydro-2H-1,4-benzothiazine for the 25 parts of 4-{3-[4-(2-hydroxyethyl)piperazino]propionyl} - 2 - phenyl-3,4-dihydro-2H-1,4-benzothiazine called for in Example 1 affords, by the procedure there described, the bis-maleic acid salt of 4-{3-[4-(3-hydroxypropyl)piperazino]propyl}-2-phenyl-3,4-dihydro-2H-1,4-benzothiazine. The free base of this compound has the following formula

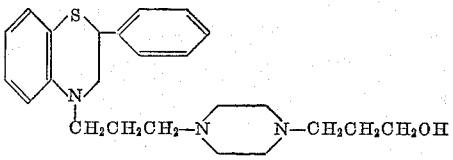

Example 3

By means of a continuous extractor, 8.2 parts of 4-{3-[4-(2-hydroxyethyl)piperidino]propionyl}-2-phenyl - 3,4-dihydro-2H-1,4-benzothiazine is extracted into a stirred suspension of 6 parts of lithium aluminum hydride in 700 parts of anhydrous ether over a period of 15 hours. Excess ethyl alcohol is added to the mixture to decompose unreacted lithium aluminum hydride and the mixture is shaken with concentrated sodium hydroxide solution. The ether layer is then separated and washed with water before it is extracted with several portions of dilute hydrochloric acid. The combined acid extracts are washed with ether and made strongly alkaline and the resultant mixture is extracted with ether. The ether layer is separated and dried and the solvent is evaporated to leave an oily residue. The residue is dissolved in acetone and hydrogen chloride gas is introduced into the solution. Addition of ether to the acetone solution precipitates the hydrochloride of the amine and this is separated from the solution and recrystallized first from a mixture of methanol and ether and then from a mixture of methylene chloride and acetone to give 4-{3-[4-(2-hydroxyethyl)piperidino]propyl}-2-phenyl-3,4-dihydro-2H-1,4-benzothiazine hydrochloride melting at about 116–119° C. The free base of this compound has the following formula

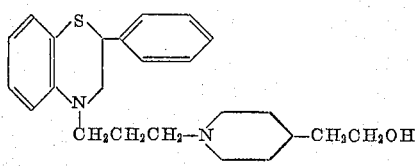

Example 4

An equivalent quantity of 4-[3-(3-hydroxymethylpiperidino)propionyl]-2-phenyl-3,4-dihydro-2H-1,4 - benzothiazine is substituted for the 4-{3-[4-(2-hydroxyethyl)piperidino]propionyl}-2-phenyl-3,4-dihydro-2H-1,4 - benzothiazine and the procedure of Example 3 is repeated. This gives 4-[3-(3-hydroxymethylpiperidino)propyl]-2-phenyl-3,4-dihydro-2H-1,4-benzothiazine hydrochloride. The free base of this compound has the following formula

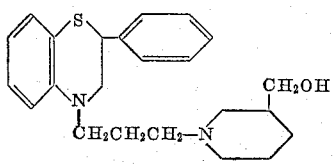

Example 5

To a stirred solution of 7 parts of lithium aluminum hydride and 700 parts of anhydrous ether is added portionwise a solution of 16 parts of 4-{3-[4-(3-hydroxypropyl)piperidino]propionyl}-2-phenyl-3,4-dihydro-2H-1,4 - benzothiazine in 500 parts of anhydrous ether. The resultant mixture is stirred and refluxed for 15 hours; ethyl alcohol is added to the reaction mixture to decompose excess lithium aluminum hydride; and the resultant mixture is stirred with concentrated sodium hydroxide solution. The ether layer is then separated, washed with water and dried over anhydrous potassium carbonate. Evaporation of the solvent from the ether solution leaves a white solid which is recrystallized from a mixture of benzene-heptane to give 4 - {3-[4-(3-hydroxypropyl)piperidino]propyl}-2-phenyl-3,4-dihydro-2H-1,4-benzothiazine melting at 136–140° C.

This compound has the following formula

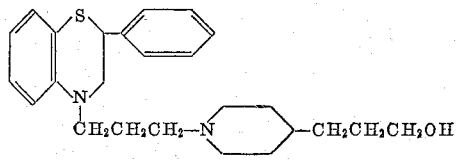

What is claimed is:

1. A compound of the formula

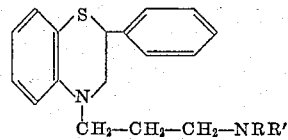

wherein —NRR′ is selected from the group consisting of lower monohydroxyalkyl piperidino and lower monohydroxyalkyl piperazino.

2. A compound of the formula

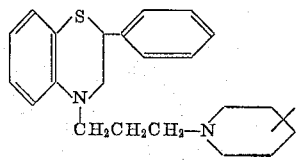

3. 4 - {3 - [4 - (2-hydroxyethyl)piperidino]propyl}-2-phenyl-3,4-dihydro-2H-1,4-benzothiazine.

4. 4 - {3 - [4-(3-hydroxypropyl)piperidino]propyl}-2-phenyl-3,4-dihydro-2H-1,4-benzothiazine.

5. A compound of the formula

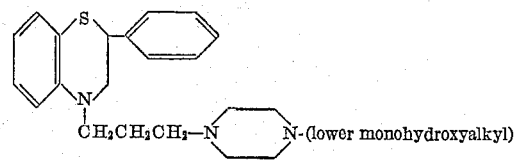

6. 4 - {3 - [4 - (2-hydroxyethyl)piperazino]propyl}-2-phenyl-3,4-dihydro-2H-1,4-benzothiazine.

References Cited in the file of this patent
UNITED STATES PATENTS

| | | |
|---|---|---|
| 2,947,744 | Lowrie | Aug. 2, 1960 |
| 2,963,476 | De Stevens | Dec. 6, 1960 |
| 3,006,916 | Winthrop et al. | Oct. 31, 1961 |

OTHER REFERENCES

Funke et al.: Bull. Soc. Chim., France, 1961, pages 1524–26.

Kerwin et al.: Jour. Organic Chemistry, vol. 24, pages 1719, 1959.